(12) United States Patent
Fertig

(10) Patent No.: US 10,822,056 B2
(45) Date of Patent: Nov. 3, 2020

(54) SYSTEM AND METHOD FOR SPECIALIZED VESSEL DECK COATING TREATMENTS

(71) Applicant: Christopher William Fertig, Virginia Beach, VA (US)

(72) Inventor: Christopher William Fertig, Virginia Beach, VA (US)

(*) Notice: Subject to any disclaimer, the term of this patent is extended or adjusted under 35 U.S.C. 154(b) by 584 days.

(21) Appl. No.: 15/610,541

(22) Filed: May 31, 2017

(65) Prior Publication Data
US 2017/0349240 A1  Dec. 7, 2017

Related U.S. Application Data

(60) Provisional application No. 62/343,961, filed on Jun. 1, 2016.

(51) Int. Cl.
*B63B 3/68* (2006.01)
*B63J 2/12* (2006.01)
*C09D 5/18* (2006.01)

(52) U.S. Cl.
CPC ............... *B63B 3/68* (2013.01); *B63J 2/12* (2013.01); *C09D 5/18* (2013.01)

(58) Field of Classification Search
None
See application file for complete search history.

(56) References Cited

U.S. PATENT DOCUMENTS

| 9,303,912 B1* | 4/2016 | Schalla ............... A47B 96/021 |
| 2016/0160515 A1* | 6/2016 | Wallance .................. E04H 1/04 52/79.1 |

* cited by examiner

*Primary Examiner* — Shamim Ahmed
*Assistant Examiner* — Bradford M Gates
(74) *Attorney, Agent, or Firm* — The Olmsted Law Group; Andrew Olmstead

(57) ABSTRACT

A system and method for the application and thermal curing of specialized vessel deck coatings is disclosed. A system capable of controlling environmental conditions is assembled on the deck of a vessel and utilized to control conditions within the system during application and curing of deck coatings is disclosed. A method of utilizing a system capable of controlling environmental conditions during the pretreatment, treatment and curing phases of specialized vessel deck coatings is also disclosed.

11 Claims, 4 Drawing Sheets

SYSTEM AND METHOD FOR SPECIALIZED VESSEL DECK COATING TREATMENTS

CROSS-REFERENCE TO RELATED APPLICATIONS

The present application claims priority of provisional application No. 62/343,961, filed Jun. 1, 2016.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable

FIELD OF THE INVENTION

The present invention generally relates to deck coatings on vessels. In particular, the present invention relates to deck coatings and treatments upon vessels requiring heat-resistant and non-skid decks, such as air capable Navy and Coast Guard ships including aircraft carriers and the like.

BACKGROUND OF THE INVENTION

The origin of the modern day aircraft carrier, and smaller air capable ships, may be traced back to the 19$^{th}$ Century, when manned balloons were launched from ships for observation purposes. In 1903, the Wright brothers launched the Flyer I, which is commonly accepted as the first sustained, controlled and powered flight by a fixed-wing aircraft. In 1910, the first fixed-wing aircraft took flight from a US Navy Cruiser.

Though there have been many developments leading to our modern-day air capable ship, the concept remains the same-air capable ships are vessels allowing the takeoff and landing of aircraft from the flight deck of a ship.

In particular, two features are important for the flight deck of an air capable ship—it needs a non-skid surface and a surface resistant to exhaust temperatures from aircraft engines. The surface must be non-skid so a landing aircraft may slow to a stop before the end of the limited landing area and to prevent slips, trips and falls by the aircraft deck handling crews. The surface must also be temperature-resistant so that the high exhaust temperatures of aircraft do not damage the vessel itself.

Traditionally, the United States Navy and Coast Guard have utilized coating systems wherein the deck of an air capable ship is treated with a roll-on type of non-skid coating containing aggregate particles. These systems allow application of a coating that may be painted onto a flight deck in a manner akin to that of using a paint roller to paint a wall, though on a much larger scale and resulting in a finish that has a much rougher texture.

Advanced modern aircraft, such as the V-22 Osprey and the F-35 Joint Strike Fighter, have exhaust gas downwashes higher than those of traditional aircraft. These aircraft feature short takeoff and landing (STOL) and vertical takeoff and landing (VTOL) capabilities, which focus exhaust blasts over a more confined area for longer periods of time than traditional takeoffs and landings. In addition, many other modern aircraft have directional exhaust systems, further focusing the higher exhaust temperatures onto a concentrated spot on the flight deck. As a result, traditional deck coating systems are no longer suitable for air capable flight decks, and coating failures are becoming commonplace. The traditional coatings are simply not designed for prolonged, directed, high temperature exhaust blasts.

In an attempt to remedy this deficiency, the Navy Research Laboratory is currently experimenting with alternative deck coatings. The leading experimental system utilizes a wire composite of aluminum and ceramic, which is fed into a melting system and "sprayed" onto the deck of a ship. When the melted composite beads land on the deck, they fuse with the surface of the deck and provide a durable and abrasive surface. An abrasive surface is desirable because oils and hydraulic fluids on a deck cause it to become slippery and may present a safety hazard. A durable surface is desirable for maintenance cost minimization and longer operating periods.

Once the composite coating is applied, high temperature paint capable of withstanding damage from modern aircraft exhaust temperatures is then used to further coat the composite and the deck. This layer of paint provides an additional level of thermal protection, while sealing the surface of the deck itself, preventing rust and other degradation from the environment in which such vessels operate. However, 75% of flight decks experience failures of the paint layer, mainly because standard methods of application do not provide for proper curing of the coatings.

There is therefore a need for a system and method of application and curing coatings to the deck of a vessel so that optimal levels of heat resistance and durability are reached. The goal of the present invention is to remedy the deficiencies found in the prior art and in the currently tested systems and methods of treating vessel decks.

The inventor has performed a search of the prior art and believes the present invention is a new and useful invention for which patent protection is warranted.

SUMMARY OF THE INVENTION

Within the preferred embodiment, and the alternative embodiments disclosed herein, a system and method for the application and curing of temperature resistant vessel coatings is provided. The system utilizes a transportable modular treating area ("oven") capable of maintaining varying internal environmental parameters, with a volume of sufficient size to allow a user to enter and apply a coating to the deck of a vessel. Concurrently provided is a method of using such a system in stages to first bring the environment within the oven to desired parameters ideal for treating the deck of a vessel, then bringing the environment within the oven to parameters ideal for the curing of the treatment to the deck of the vessel. Monitoring apparatus within the oven allow a user to ensure the appropriate environment is kept throughout the curing process and to adjust the environment within the oven as necessary.

DETAILED DESCRIPTION OF THE INVENTION

Figure 1:
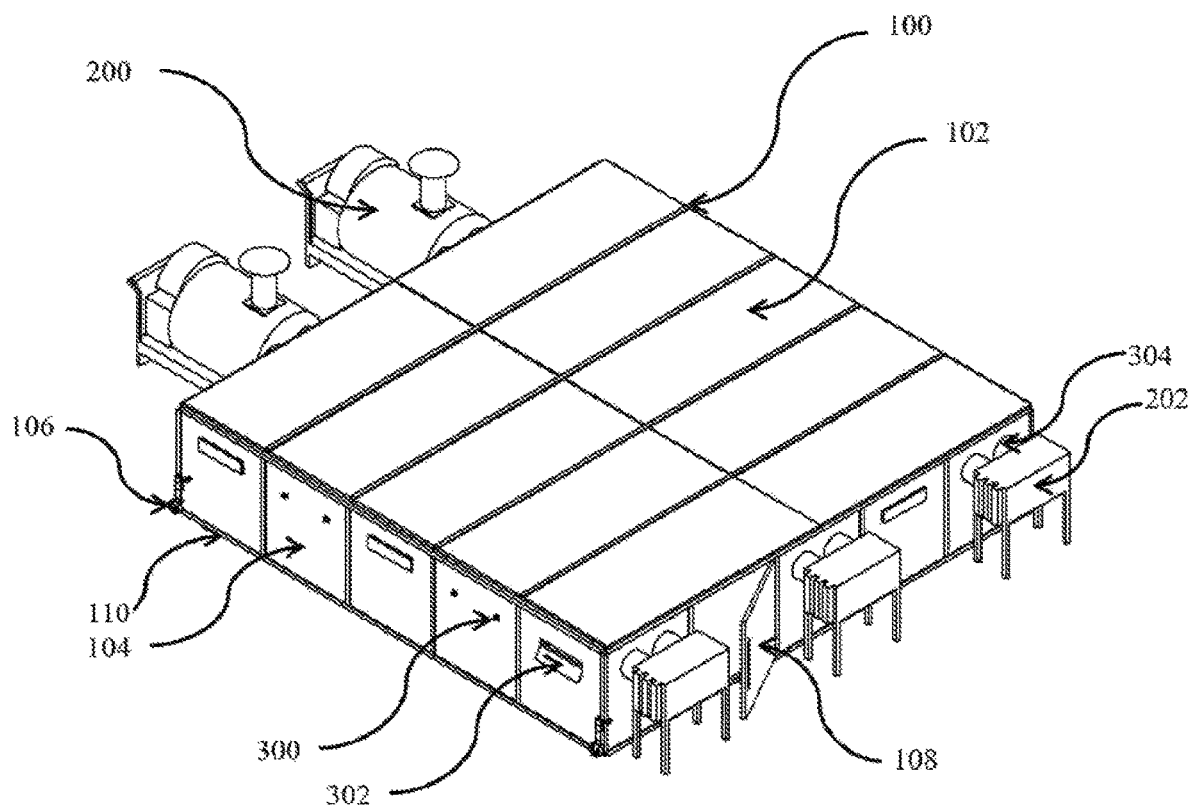
FIG. 1 is a perspective view of the present invention, as it would be seen assembled on the deck of a vessel.

Referring now to FIG. 1, there is shown the insulated modular frame 100. Situated atop the insulated modular frame 100, between each frame member, are modular insulated top panels 102. Situated along the sides of the insulated modular frame 100, between each frame member are modular insulated side panels 104. Situated at the corners of the insulated modular frame 100 are jacking wheels 106, which allow the entire present invention to be raised and lowered from the deck of a vessel for movement to different locations on the deck. A high-temperature sealing gasket 110 may be featured along the base of the insulated modular frame 100 to further insulate the entire invention while in operation.

Still referring to FIG. 1, there is shown a plurality of main heaters 200, and a plurality of pre-heaters 202. The preferred embodiment of the present invention calls for diesel heaters to be used as the main heaters 200 and electric heaters as the pre-heaters 202, though any type of heater of sufficient strength to heat the working area and of sufficient strength to cure the treatment will be recognized as within the scope and spirit of the invention.

Still referring to FIG. 1, there is shown a plurality of temperature probes 300. The preferred embodiment of the present invention calls for the use of probes able to transmit temperature data, though any means of measuring temperature within the assembled invention may be used. Exhaust vents 302 are also shown, which allow the user to release heat from within the present invention to maintain the desired internal temperature, as necessary. Heat intake ducts 304 are also shown, which allow for the inlet of heat from the main heaters 200 and pre-heaters 202.

Figure 2:
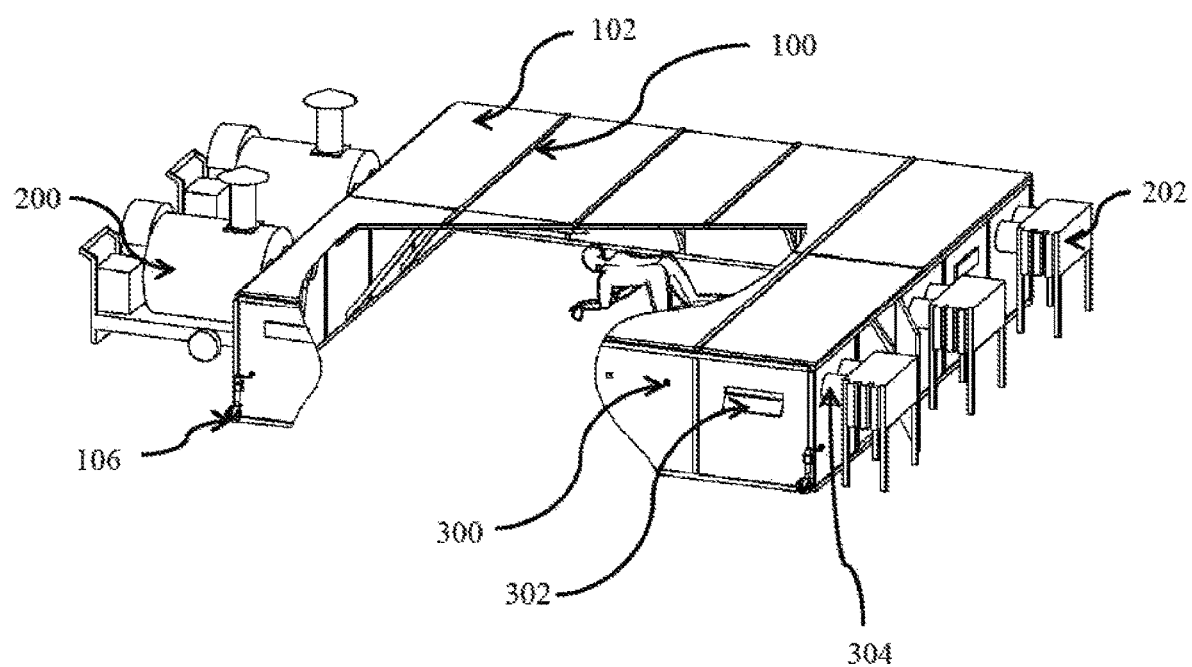
FIG. 2 is a perspective cutaway view of the present invention, as assembled on the deck of a vessel showing the internal configuration and a worker within, for scale.

Referring now to the cutaway view of the present invention in FIG. 2, the components of the present invention as described above are shown. FIG. 2 additionally shows a worker inside the working area of the present invention, for scale.

Figure 3:
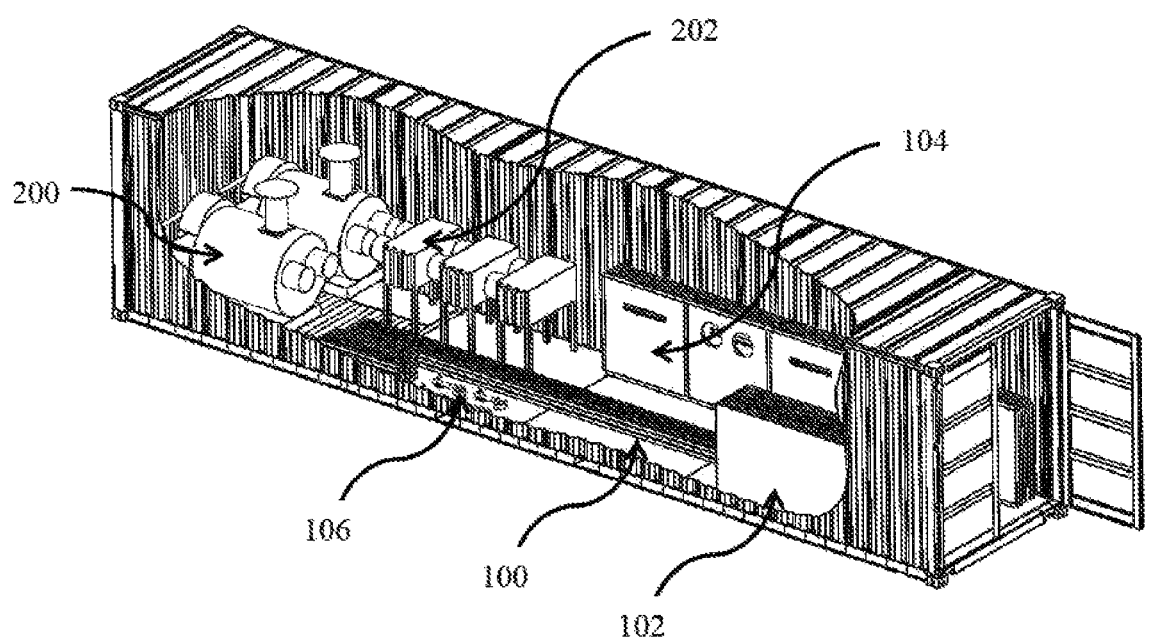
FIG. 3 is a cutaway view of an ISO shipping container, showing the present invention disassembled and packed for transport.

Referring now to FIG. 3, the present invention is shown in a broken-down form and packed within an ISO shipping container 400. The ISO shipping container 400 is illustrated in a cut-away view to demonstrate the ability of a user to pack the main heaters 200, pre-heaters 202, insulated modular frame 100, modular insulated top panels 102, modular insulated side panels 104 and jacking wheels 106 within the ISO shipping container 400 for storage and transport, with spare room for other components such as temperature probe(s) 300 or ancillary supplies which would be helpful for application of deck coatings.

Figure 4:
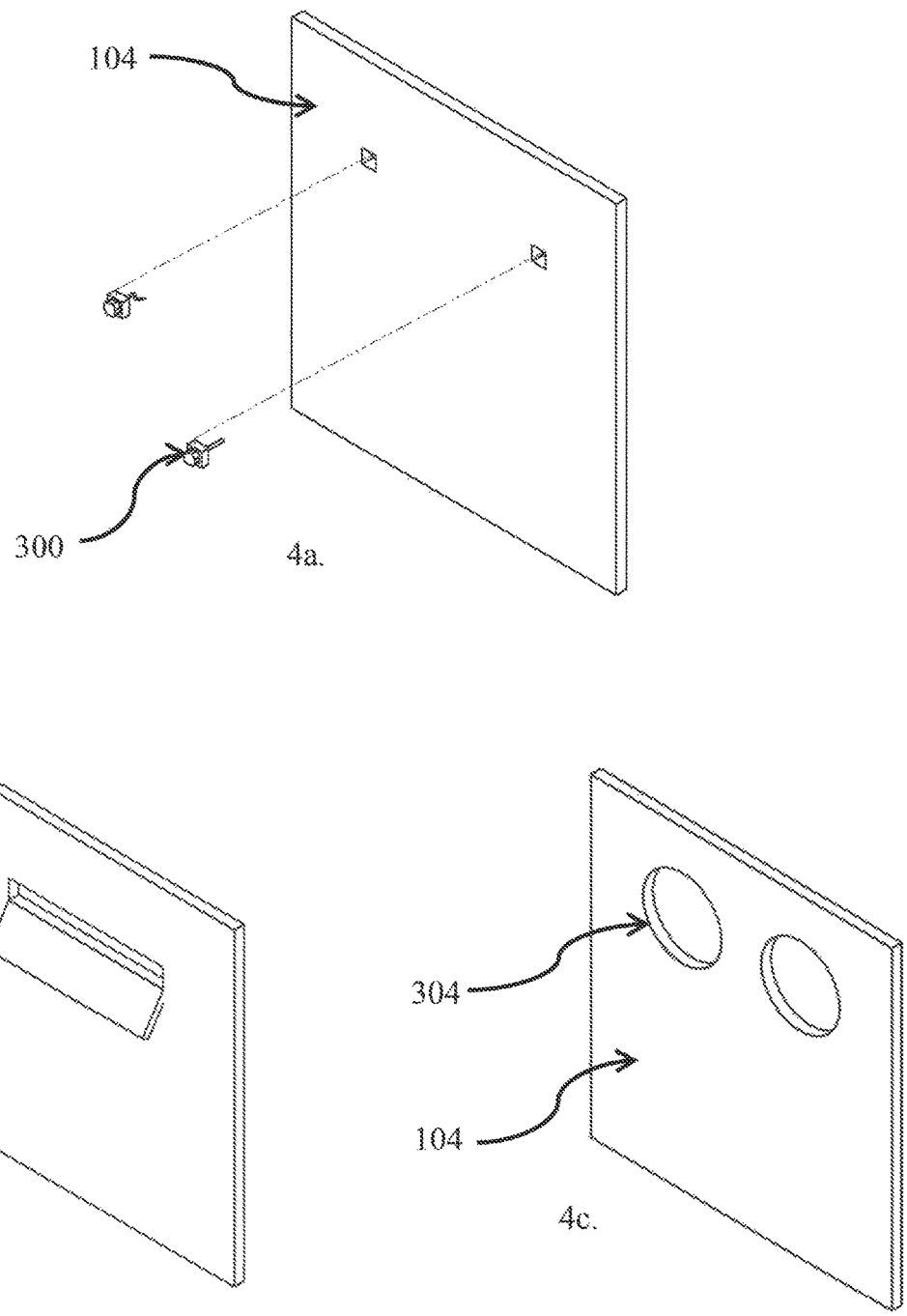
FIGS. 4a-c are close-up views of differing side panels, showing the placement of temperature probes, exhaust vents and heat intake ducts.

Referring now to FIGS. 4a-c, close up views of three different side panels are shown. 4a shows a modulated insulated side panel 104 designed for insertion of temperature probe 300. 4b shows a modulated insulated side panel 104 with a vent flap 302. 4c shows a modulated insulated side panel 104 with an opening for a heat intake duct 304.

Referring to the system described above and illustrated in all Figures, the method of application of a deck coating utilizing the system will be discussed.

In its preferred embodiment, the present invention would be transported within an ISO shipping container 400 and placed upon the deck of a vessel to be treated. Users would unpack all components of the system, connect the members of the insulated modular frame 100 and place the modular insulated top 102 and side 104 panels in their respective areas. The jacking wheels 106 would be attached to the corners of the assembled frame 100.

The temperature probes 300 would be inserted into the appropriate panels. The main 200 and pre 202 heaters would be placed external to the modular insulated side panels 104, with their outputs leading through the heat intake ducts 304 to within the system. The system would then be fully assembled and ready for operation.

A user would then activate the pre heaters 202 to bring environmental conditions within the system up to the ideal operating temperature for the vessel treatment. The exact temperature and humidity would depend on the particular coating to be applied. Testing of the present system on one particular type of heat resistant paint has shown that preheating at 80 degrees Fahrenheit for a period of 12 hours prior to painting is ideal. Temperature probes 300 and vent flaps 302 would be used to monitor conditions and maintain desired parameters. Once the correct pre-heat temperature is reached, the user(s) would enter through the access door 108, apply the coating and exit, sealing the access door 108 upon exiting. In the same testing mentioned above, maintaining the same environmental parameters for a period of 2 hours lends to desirable results.

At this point, the main heaters 200 would be activated, bringing the temperatures within the system up to the desired curing temperature. Again, the exact curing temperature will be dependent on the paint used. Testing shows that maintaining a temperature between 200-250 degrees Fahrenheit for a period of 12 hours leads to a desirable result. As in the preheating stage, the temperature probes 300 and vent flaps 302 would operate concurrently to maintain conditions as desired.

Upon full curing of the coating, the main 200 and pre 202 heaters may be moved to the next treatment area, while the jacking wheels 106 are used to raise and move the remainder of the system to the next treatment area. Such a process would continue until the deck is fully coated, or the portions of the deck where coating is needed are covered.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the described embodiment, method, and examples, but by all embodiments and methods within the scope and spirit of the invention as claimed.

What is claimed is:

1. A system for curing specialized vessel deck coatings comprising:
    a plurality of insulated frame members capable of connection to form a skeletal frame for support of a plurality of insulated panels capable of insertion within the skeletal frame to form an area enclosed on all four sides and above;
    a plurality of insulated gaskets for insertion along a base of the insulated panels and skeletal frame;
    at least one insulated access door passing through at least one insulated panel, said door of sufficient height and width for an adult human to enter the enclosure formed by the frame members and insulated panels;
    a means of venting heat from within the enclosure formed by the frame members and insulated panels;

a means of monitoring environmental conditions within the enclosure formed by the frame members and insulated panels;

a means of raising the temperature within the enclosure formed by the frame members and insulated panels to at least 110 degrees Fahrenheit;

an additional means of raising the temperature within the enclosure formed by the frame members and insulated panels to at least 275 degrees Fahrenheit;

a plurality of jacking wheels enabling a user to raise and roll the enclosure formed by the frame members and insulated panels.

2. The system of claim 1 where the insulated frame members are composed primarily of stainless steel capable of insulation to temperatures of at least 250 degrees Fahrenheit.

3. The system of claim 1 where the insulated panels are composed of temperature-resistant foam capable of insulation to temperatures of at least 250 degrees Fahrenheit.

4. The system of claim 1 where the insulated gaskets are composed of silicon or a silicon-based material capable of insulation to temperatures of at least 250 degrees Fahrenheit.

5. The system of claim 1 where the means of venting heat are a plurality of venting doors along the insulating panels, said venting doors capable of being opened from outside the enclosure.

6. The system of claim 1 where the means of monitoring the environmental conditions within the system is a plurality of temperature sensors, humidity sensors and a monitoring station capable of displaying an internal temperature and humidity in a location external to the system.

7. The system of claim 1 where the means of raising the temperature within the enclosure is a plurality of electric heaters.

8. The system of claim 1 where the means of raising the temperature within the enclosure is a plurality of heaters using petroleum-based fuel as an energy source.

9. The system of claim 1 where the means of raising the temperature within the enclosure is a combination of electric and petroleum-based heaters.

10. The system of claim 1 where the means of raising the temperature within the enclosure are external to the enclosure, utilizing ducts passing through the insulated panels to allow heated air to enter the insulated enclosure.

11. The system of claim 1 wherein the entire system is comprised of a modular design able to fit within a standard ISO dry shipping container for transport.

* * * * *